United States Patent
Franzen et al.

(10) Patent No.: US 8,128,064 B2
(45) Date of Patent: Mar. 6, 2012

(54) FLOOR-BOUND TRANSPORTATION VEHICLE, IN PARTICULAR FOR THE TRANSPORTATION OF CONTAINERS

(75) Inventors: Hermann Franzen, Monchengladbach (DE); Armin Wieschemann, Oberhausen (DE); Jannis Moutsokapas, Monheim (DE)

(73) Assignee: Gottwald Port Technology GmbH, Duesseldorf (DE)

( * ) Notice: Subject to any disclaimer, the term of this patent is extended or adjusted under 35 U.S.C. 154(b) by 430 days.

(21) Appl. No.: 12/443,865

(22) PCT Filed: Sep. 28, 2007

(86) PCT No.: PCT/EP2007/060323
§ 371 (c)(1), (2), (4) Date: Apr. 1, 2009

(87) PCT Pub. No.: WO2008/046728
PCT Pub. Date: Apr. 24, 2008

(65) Prior Publication Data
US 2010/0213430 A1 Aug. 26, 2010

(30) Foreign Application Priority Data

Oct. 19, 2006 (DE) .......................... 10 2006 049 372
Aug. 23, 2007 (DE) .......................... 10 2007 039 778

(51) Int. Cl.
*B60P 1/48* (2006.01)
*B60P 1/02* (2006.01)
(52) U.S. Cl. ....................................... 254/9 C; 254/2 C
(58) Field of Classification Search .................. 254/9 C, 254/2 C; 280/43.12, 43.24
See application file for complete search history.

(56) References Cited

U.S. PATENT DOCUMENTS

| | | | | |
|---|---|---|---|---|
| 472,922 A * | 4/1892 | Griffith | ......................... | 254/2 C |
| 697,070 A * | 4/1902 | Colborne | ...................... | 254/2 C |
| 979,898 A * | 12/1910 | Steele | ......................... | 280/43.16 |
| 2,043,887 A * | 6/1936 | Dement | ......................... | 254/9 C |
| 2,438,571 A * | 3/1948 | Maxon, Jr. | ...................... | 280/43 |
| 2,449,863 A | 9/1948 | Ross | | |
| 2,940,767 A * | 6/1960 | Quayle | ...................... | 280/43.12 |
| 2,993,703 A * | 7/1961 | Paradise | .................... | 280/43.12 |

(Continued)

FOREIGN PATENT DOCUMENTS

DE    4138512 A1    5/1993

(Continued)

OTHER PUBLICATIONS

U.S. Appl. No. 12/673,927, filed Feb. 17, 2010, by Hermann Franzen, et al.
International Search Report and Written Opinion of the International Searching Authority from corresponding Patent Cooperation Treaty (PCT) Application No. PCT/EP2007/060323, mailed Dec. 6, 2007.

*Primary Examiner* — David B Thomas
(74) *Attorney, Agent, or Firm* — Gardner, Linn, Burkhart & Flory, LLP

(57) ABSTRACT

The invention relates to a floor-bound transportation vehicle for the transportation of containers, with at least one lifting platform which is arranged on a vehicle frame of the transportation vehicle and can be lifted from a lowered transportation position into a raised transfer position via a lifting drive and, conversely, can be lowered. The lifting platform is fastened on the vehicle frame via at least one toggle lever. The lifting platform can be raised or can be lowered via the at least one toggle lever. The lifting drive acts on the at least one toggle lever, and the lifting platform is guided on the transportation vehicle for the lifting and lowering movement.

26 Claims, 7 Drawing Sheets

U.S. PATENT DOCUMENTS

| | | |
|---|---|---|
| 3,214,136 A | 10/1965 | Marks |
| 3,266,774 A | 8/1966 | Goyarts |
| 3,319,932 A | 5/1967 | Szczepanik |
| 3,497,092 A | 2/1970 | McIntyre |
| 4,792,272 A | 12/1988 | Oswald et al. |
| 5,525,019 A | 6/1996 | Moore et al. |

FOREIGN PATENT DOCUMENTS

| | | |
|---|---|---|
| EP | 0136970 B1 | 3/1987 |
| EP | 0302569 B1 | 5/1991 |

* cited by examiner

FLOOR-BOUND TRANSPORTATION VEHICLE, IN PARTICULAR FOR THE TRANSPORTATION OF CONTAINERS

CROSS REFERENCE TO RELATED APPLICATION

This application claims the priority benefits of International Application No. PCT/EP2007/060323, filed on Sep. 28, 2007, which is hereby incorporated herein by reference in its entirety.

BACKGROUND OF THE INVENTION

The invention concerns a floor-bound transportation vehicle, in particular for the transportation of containers, with at least one lifting platform, arranged on a vehicle frame of the transportation vehicle, and at least one lifting drive which can raise the lifting platform(s) from a lowered transportation position into a raised transfer position and can lower the lifting platform(s) from the transfer position to the transportation position.

A system for loading and unloading a ship with containers is already known from European patent EP 0 302 569 B1. This system involves at least one dockside crane for loading and unloading the container ship moored fast to a dock. The containers are picked up from a transportation vehicle by means of the dock cranes or the containers are set down on this transportation vehicle. This transportation vehicle can travel along the dock without the use of rails and is automatically driven by a control system. The container is unloaded from the transportation vehicle or picked up from the transportation vehicle at a transfer station. This transfer station basically consists of stationary support tables, on which the containers are set down and from which the containers are picked up. These support tables are in the form of a support arm and they support the container from below in the region of its lengthwise sides. Accordingly, the spacing between adjacent support tables is narrower than the width of the container. In order to be able to pick up or set down the container on the support table, the transportation vehicle has a platform for the transport of the container, either the transportation vehicle as a whole or only its platform is raised in order to transfer a container and then the transportation vehicle with container now resting on its platform is driven out from the zone of the support tables. When using a platform which can be raised and lowered, the platform needs to be lowered again for the subsequent drive of the transportation vehicle. The setting down of a container on the support table occurs in the opposite sequence.

The lifting platform has a width which is less than the distance between the opposite-lying support tables so that the transportation vehicle can pick up the container from the transfer station. The containers are then picked up from the transfer station by a gantry crane in an automatic operation and set down in a container storage depot. At the end of the container storage depot opposite the seaside gantry crane there is provided another landside gantry crane, which can be operated in the area of the container storage depot in automatic mode and outside the container storage depot in manual mode. This landside gantry crane also has a turntable in order to turn the container by 90 degrees and then hand it off to, or retrieving from, land vehicles for transport to and from the depot. Furthermore, in regard to the transportation vehicle, it is stated that the platform can be raised and lowered by a mechanical, pneumatic or hydraulic lifting drive.

U.S. Pat. No. 2,449,863 concerns a floor-bound transportation vehicle for placement of bombs beneath the support surfaces of airplanes. This transportation vehicle has a lifting device with a lifting table to accommodate the bombs. Looking in the driving direction of the transportation vehicle, the lifting table is supported in front and behind by a toggle lever on the transportation vehicle. In order to raise the lifting table from a lowered transport position into a raised transfer position, each of the toggle levers is connected by a hydraulic cylinder to the transportation vehicle. Each of the hydraulic cylinders can be manually activated by manual pumps Since two hydraulic cylinders independent of each other can be provided, the lifting table can be raised into a transfer position that is tilted up to +/−15 degrees. Furthermore, the lifting table is guided on the vehicle by a longitudinal control arm.

From the U.S. Pat. No. 5,525,019 a vehicle for loading general cargo into airplanes is known. This vehicle has, in typical fashion, a driver's station and a platform for the cargo being loaded. The platform for the cargo can be raised from a transport position to a transfer position via a scissors lift table. The driver's station next to this platform can likewise be raised and lowered via its own lifting table by means of a scissors lift.

U.S. Pat. No. 3,319,932 concerns a trailer with a platform which can be raised and lowered, in order to transport cargo on pallets to or from a cargo airplane, for example. The trailer consists essentially of a running gear with wheels on which the platform is secured by means of two front toggle levers and two rear toggle levers. These toggle levers should also enable a tilting of the normally horizontal platform. From a front view of the trailer one notices that the rear right and left toggle levers are spaced apart from each other and each have their own support base, corresponding to around one-tenth of the width of the platform. Furthermore, the individual toggle levers consist, for example, of upper arms which are arranged with a spacing from each other for each toggle lever in itself. Thus, on the whole, the width of the arms is only a fraction of the width of the platform.

SUMMARY OF THE INVENTION

The present invention provides an automatically driven vehicle, especially one for containers, which has an improved platform for picking up and setting down loads, especially containers.

According to an aspect of the invention, in a floor-bound transportation vehicle, in particular for the transportation of containers includes at least one lifting platform, arranged on a vehicle frame of the transportation vehicle and at least one lifting device raising the platform(s) from a lowered transportation position into a raised transfer position and lowering the platform(s) from the transfer position to the transportation position includes at least one toggle lever jointing the platform(s) with the vehicle frame. The lifting platform can be raised or can be lowered via the at least one toggle lever. The lifting drive acts on the at least one toggle lever and the lifting platform is guided on the transportation vehicle for the lifting and lowering movement. The use of the toggle lever on the one hand achieves a stable supporting of the lifting platform on the vehicle frame and on the other hand advantageously deflects the thrust force acting basically in the driving direction into a lift force. Furthermore, the overall lifting drive can therefore have a small structural height and be arranged on the vehicle frame of the transportation vehicle and beneath or inside the box-shaped lifting platform which is open at the bottom.

At least two toggle levers lift and lower each platform in the driving direction of the transportation vehicle. In this way, the lifting force can be distributed more uniformly onto the lifting platform. As viewed from the driving direction of the transportation vehicle, the first toggle lever is arranged on the lifting platform in front and the second toggle lever in the rear.

Each toggle lever, viewed in the driving direction of the transportation vehicle, extends for more than half the width of the lifting platform, and may extend for more than 75% of the width of the lifting platform. Furthermore, in this way, the number of toggle levers required for adequate stability of support can be limited to two.

In terms of structural design, each toggle lever may consist of a first toggle lever arm and a second toggle lever arm, which are connected to each other by a toggle joint. The first toggle lever arm is mounted on the vehicle frame via an axis of articulation at its end away from the toggle joint and the second toggle arm on the lifting platform via an axis of articulation at its end away from the toggle joint.

To enable the lifting platform to be lifted and lowered, the lower axes of articulation, the axes of the hingelike toggle joints, and the upper axes of articulation may run parallel to each other. The two toggle levers are arranged between the lifting platform and the vehicle frame so that the toggle joints move onto each other when the lifting platform moves from the transfer position to the transportation position.

In order to guide the lifting platform in the lifting and lowering direction, the lifting platform may be guided by at least one longitudinal control arm on the vehicle frame, the longitudinal control arm is articulated to the lifting platform at its first end by a first axis and it is articulated to the vehicle frame at its second opposite end by a second axis. One longitudinal control arm is arranged at left and right alongside the lifting platform, looking in the driving direction of the transportation vehicle, and the two longitudinal control arms run parallel to each other.

Furthermore, to enable the lifting platform to be raised and lowered, the first axis and the second axis may run parallel to each other and parallel to the lower axes, the axes of the hingelike toggle joints, and the upper axes.

Two lifting platforms may be arranged, one immediately behind the other, as viewed in the driving direction of the transportation vehicle, maintaining a spacing between them. The lifting platforms are of such dimension that a 20-foot container can be accommodated by each lifting platform, measured in the driving direction of the transportation vehicle, or the two lifting platforms together can accommodate a 40-foot container or a 45-foot container, measured in the driving direction of the transportation vehicle. Thus, the transportation vehicle has diversified uses.

The lifting drive may consist of a drive motor, arranged on the transportation vehicle, which acts on the toggle lever via an actuating screw drive. Alternatively, the lifting drive may consist of a drive motor, arranged on the transportation vehicle, which acts on the two toggle levers via a transmission and two actuating screw drives.

These and other objects, advantages and features of this invention will become apparent upon review of the following specification in conjunction with the drawings.

BRIEF DESCRIPTION OF THE DRAWINGS

The invention shall now be explained more closely by means of a sample embodiment presented in a drawing in which.

DESCRIPTION OF THE PREFERRED EMBODIMENT

Figure 1:
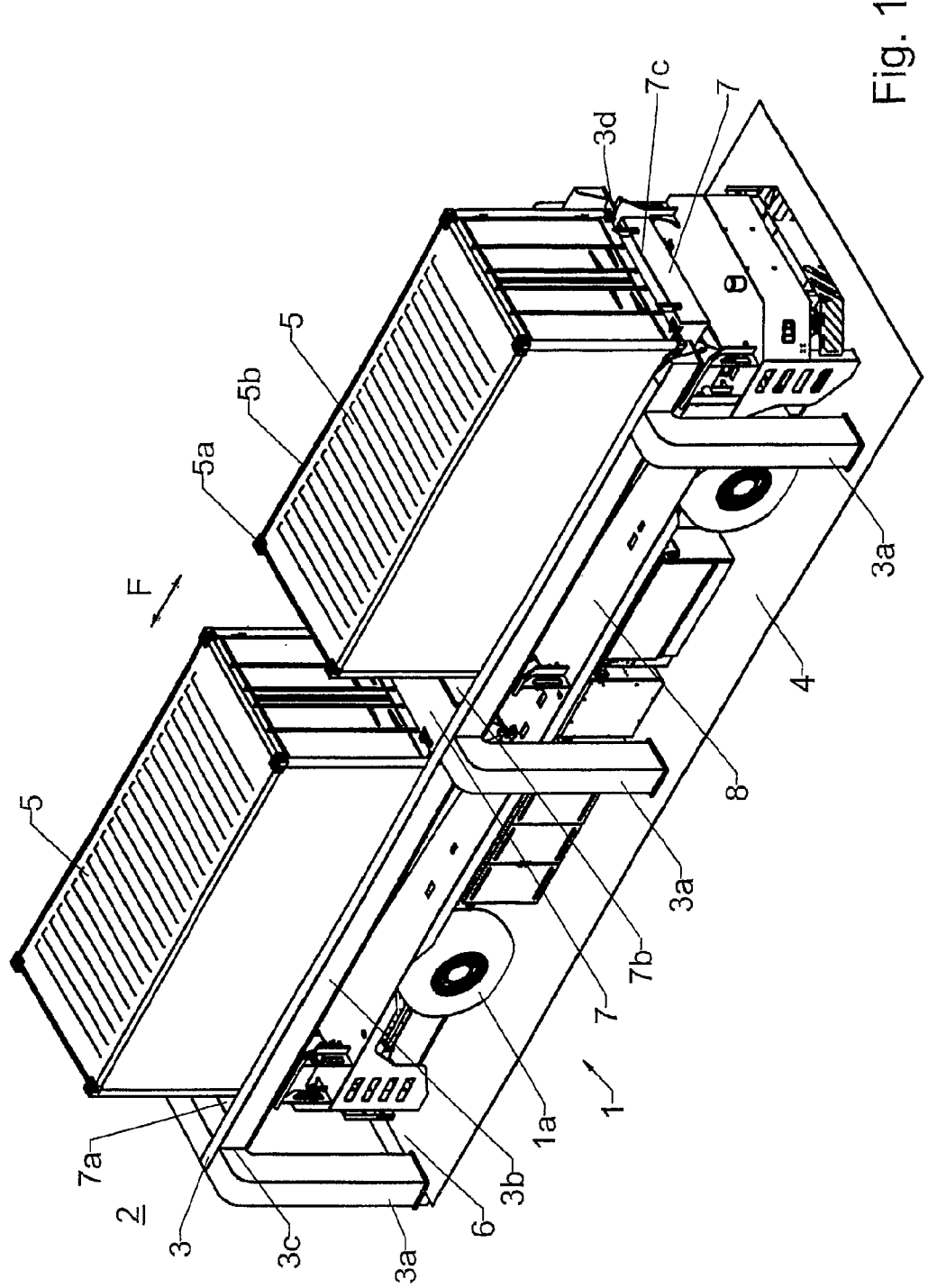
FIG. 1 is a perspective view of a floor-bound transportation vehicle according to an embodiment of the invention illustrated at a transfer station.

FIG. 1 shows a perspective view of a floor-bound transportation vehicle, such as an automatically driven vehicle 1 inside a transfer station 2. Such a transfer station can serve as an interface between the automatically driven vehicles 1 and another means of transportation, such as a gantry crane with a spreader frame as the load-receiving means or a high-leg driver-operated container transportation vehicle usually termed a straddle carrier.

The transfer station 2 basically consists of a stationary support frame 3, consisting of legs 3a in the form of vertical uprights with support rails 3b secured to them. The legs 3a rest at their lower end on a floor 4, which in the harbor district is usually part of a wharf. At their end opposite the floor 4, the legs 3a are bent slightly inward, so that they appear slightly L-shaped, looking in the driving direction F of the vehicle. The support rail 3b is then fastened to the basically vertically extending upper end surface 3c of the legs 3a. In all, six legs 3a are provided, three legs each being arranged left and right looking in the direction of driving F with a spacing from each other and from the vehicle 1 driven into the transfer station 2. The right and left legs 3a are also each arranged opposite each other. The spacing a between two oppositely facing legs 3a is chosen greater than the width b of the vehicle 1 in order to allow the vehicle 1 to be driven in. The spacing a in this case is around 100 mm greater than the width b. The support rails 3b fastened to the end surfaces 3c of the legs 3a and facing each other have an L-shaped cross section looking in the driving direction F, their long member being fastened to the end surfaces 3c of the legs 3a and the short member forming a horizontal and inwardly pointing support surface 3d for the container 5 which is to be set down on it. The containers 5 rest with their stable corner castings 5a preferably arranged at the lower corners and their lower lengthwise sides 5b lying in between on the support surfaces 3d of the support rails 3b when they are set down there by the vehicle 1 or another means of transportation.

The vehicle 1 has a lifting platform 7 which can be raised and lowered vertically with respect to a vehicle frame 8 of the vehicle 1 for setting down the container 5 on the support surfaces 3d and for picking up the container 5 from the support surfaces 3d. The lifting height of the lifting platform 7 is around 600 mm. As can be seen in FIG. 1, a first lifting platform 7a and a second lifting platform 7b are arranged on the vehicle frame 8 one behind the other, looking in the driving direction F of the vehicle 1. The length of a single lifting platform 7a, 7b is chosen such that a 20-foot container can be transported thereon. The first lifting platform 7a and the second lifting platform 7b also complement each other to form a large lifting platform on which 40-foot containers and even 45-foot containers can be transported, in the event that they are raised and lowered in synchronization.

In FIG. 1, the vehicle 1 has just driven into the transfer station 2. This usually occurs in automatic operation, so that the entrance channel 6 with width of a between the opposite legs 3a of the support frame 3 must also be only slightly larger than the width b of the vehicle 1. Before the vehicle 1 enters the transfer station 2, the vehicle 1 was halted briefly in order to raise the first lifting platform 7a and the second lifting platform 7b with their respective containers 5 from their lower transport position to their upper lifting position. In this lifting position, the lifting surface 7c of the particular lifting platforms 7a, 7b on which the container 5 rests extends beyond the vertically inwardly extending support surfaces 3d of the support rails 3b. The lifting platforms 7a, 7b have a smaller width c looking in the driving direction F than the spacing d between the support surfaces 3d of the opposite legs 3a of the support frame 3. Thus, the vehicle 1 with lifting platforms 7a, 7b raised into the lifting position can drive into the transfer station 2 without the lifting platform 7a, 7b making contact with the support rails 3b. The lifting surface 7c of the lifting platforms 7a, 7b is also located above the support surfaces 3d, so that when the vehicle 1 drives into the transfer station 2, the lower surface 5c (see FIG. 3) of the container 5, especially its corner castings 5a, is situated above the support surfaces 3d. When the vehicle 1 has reached its desired depth of entry into the transfer station 2, the lifting platforms 7a, 7b are lowered into their transport position and the container 5 is set down by its corner castings 5a and its lengthwise side 5b onto the support surfaces 3d of the support rails 3b. After this, the vehicle 1 can again exit from the transfer station 2 with its lifting platforms 7a, 7b lowered, leaving behind the container 5 on the support frame 3. The guide surface 9a in this case runs parallel with the driving direction F of the vehicle 1.

Figure 2:
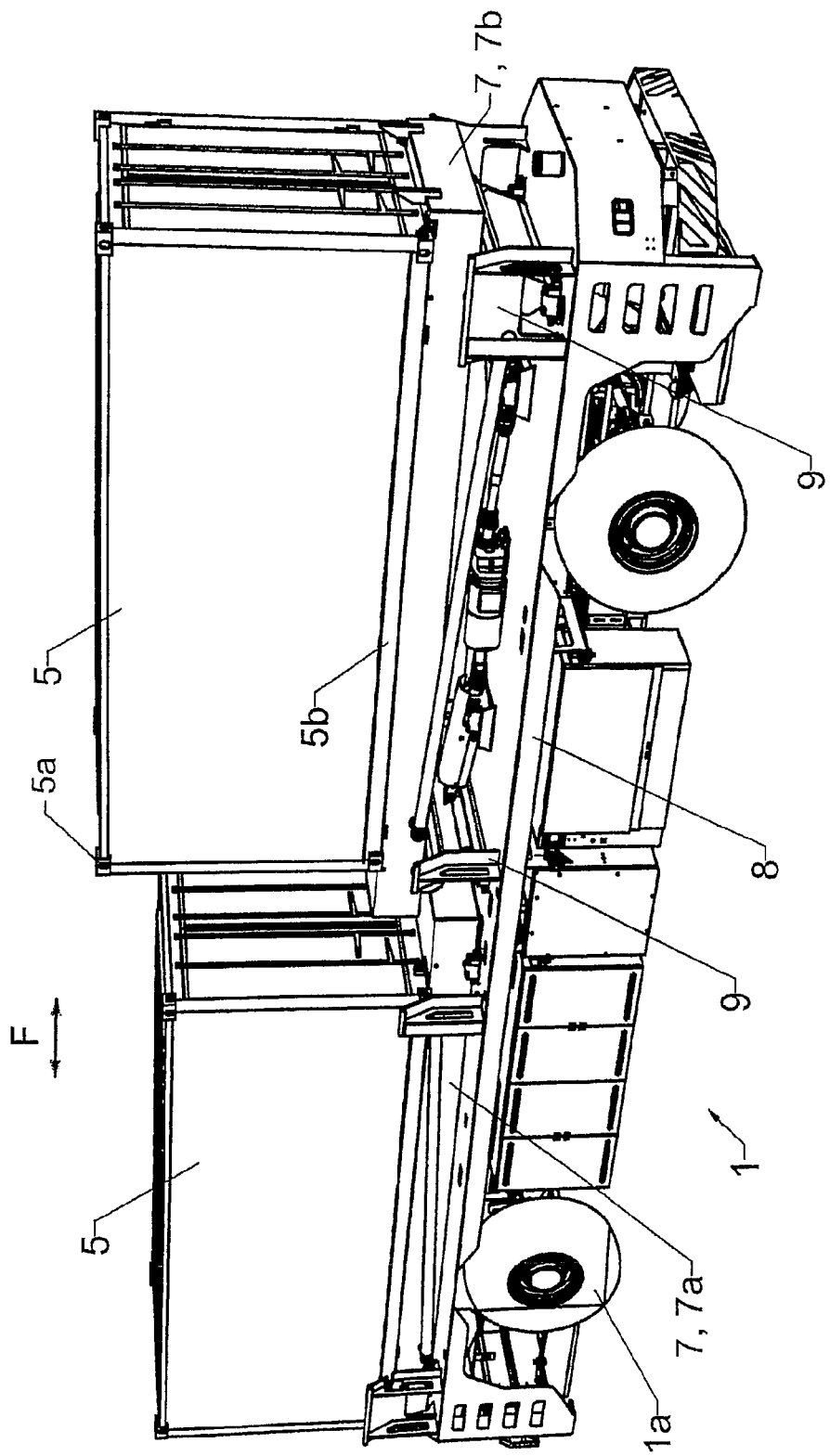
FIG. 2 is a perspective view of the vehicle in FIG. 1 illustrated outside a transfer station.

FIG. 2 shows a perspective view of a vehicle 1 per FIG. 1 in which, to illustrate the function of the lifting platforms 7a, 7b, the first left-hand lifting platform 7a is seen in the lowered transport position and the second right-hand lifting platform 7b in its raised lifting position. In the lowered transport position, the first lifting platform 7a lies with its full area on the vehicle frame 8 of the automatically driven vehicle 1. To facilitate a setting down of the container 5 on the first lifting platform 7a and the second lifting platform 7b, each of which is in the lower transport position for this process, funnel-shaped guide elements 9 are provided right and left on the vehicle frame 8 of the vehicle 1 looking in the driving direction F of the vehicle 1, next to the lifting platforms 7a, 7b in their respective beginning and end regions. These guide elements 9 have a guide surface 9a directed inward to the lifting platforms 7a, 7b, which widens toward the top, starting from the vehicle frame 8, and thus orients a container 5 laterally onto the lifting platform 7a, 7b when the lifting platforms 7a, 7b are lowered.

As can also be seen from FIGS. 1 and 2, the vehicle 1 is not a rail vehicle, but a vehicle 1 with tires 1a.

Figure 3:
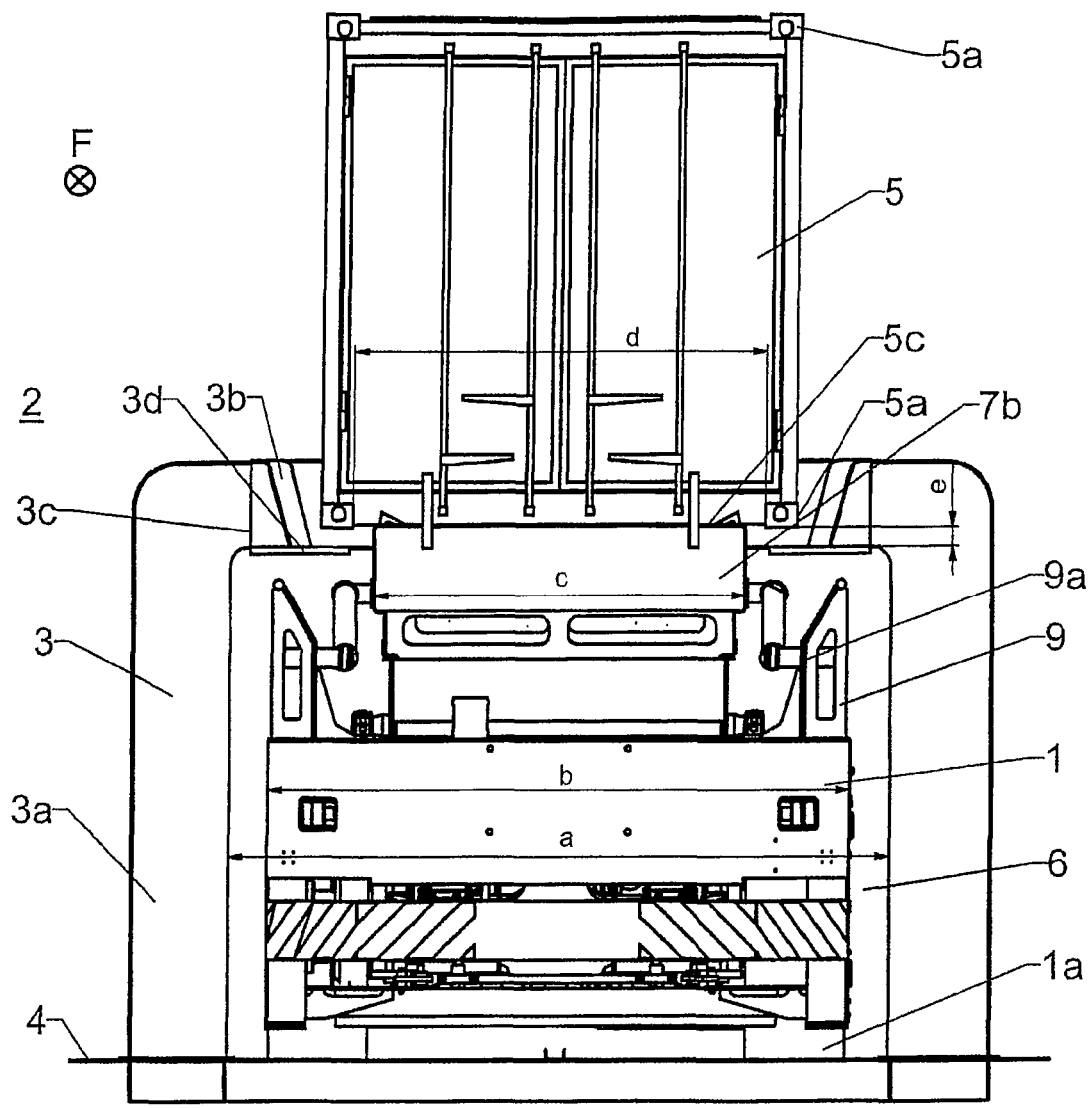
FIG. 3 is a front elevation of the vehicle in FIG. 1, in which the lifting platform of the vehicle has been raised to a transfer position.

FIG. 3 shows a front view of FIG. 1 in the driving direction F of the vehicle 1, which is parked in the transfer station 2. The container 5, which can be seen in this FIG. 3, and the second lifting platform 7b are in the raised lifting position, as is also shown in FIG. 1. One notices that the corner castings 5a of the container 5 are situated at a distance e above the support surfaces 3d of the support rails 3b. This distance e can vary between 50 and 150 mm, depending on the loading state of the container 5 and the fill pressure of the tires 1a.

Figure 4:
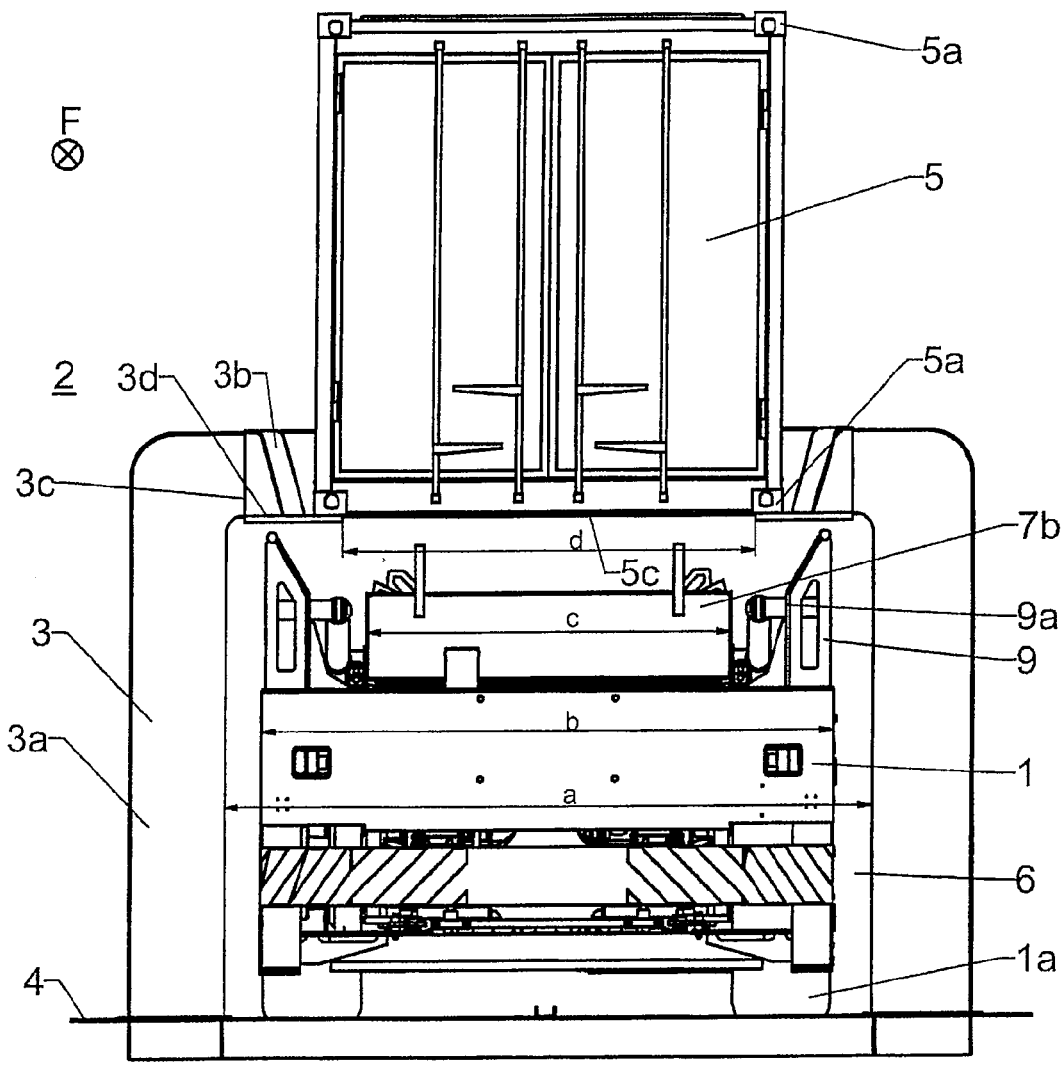
FIG. 4 is the same view as FIG. 3, with the lifting platform lowered to a transportation position.

FIG. 4 shows a view matching FIG. 3, but the second lifting platform 7b is in its lowered transport position, without carrying a container 5. The container 5 lies with its corner castings 5a and its lengthwise sides 5b lying in between on the support surfaces 3d of the support rails 3b.

Figure 5:
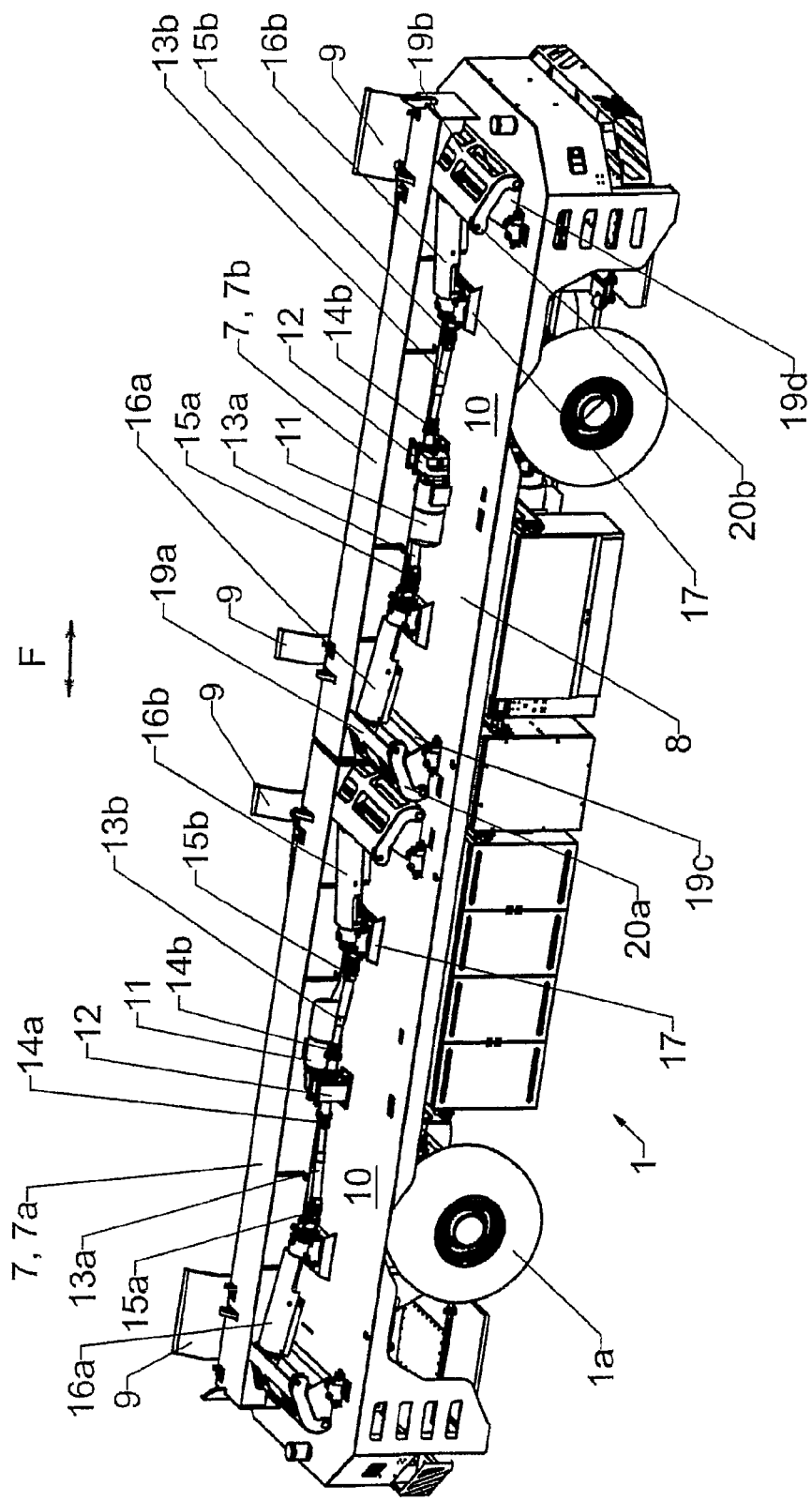
FIG. 5 is the same view as FIG. 2, with a portion of the lifting platform and the lifting drive removed.
Figure 6:
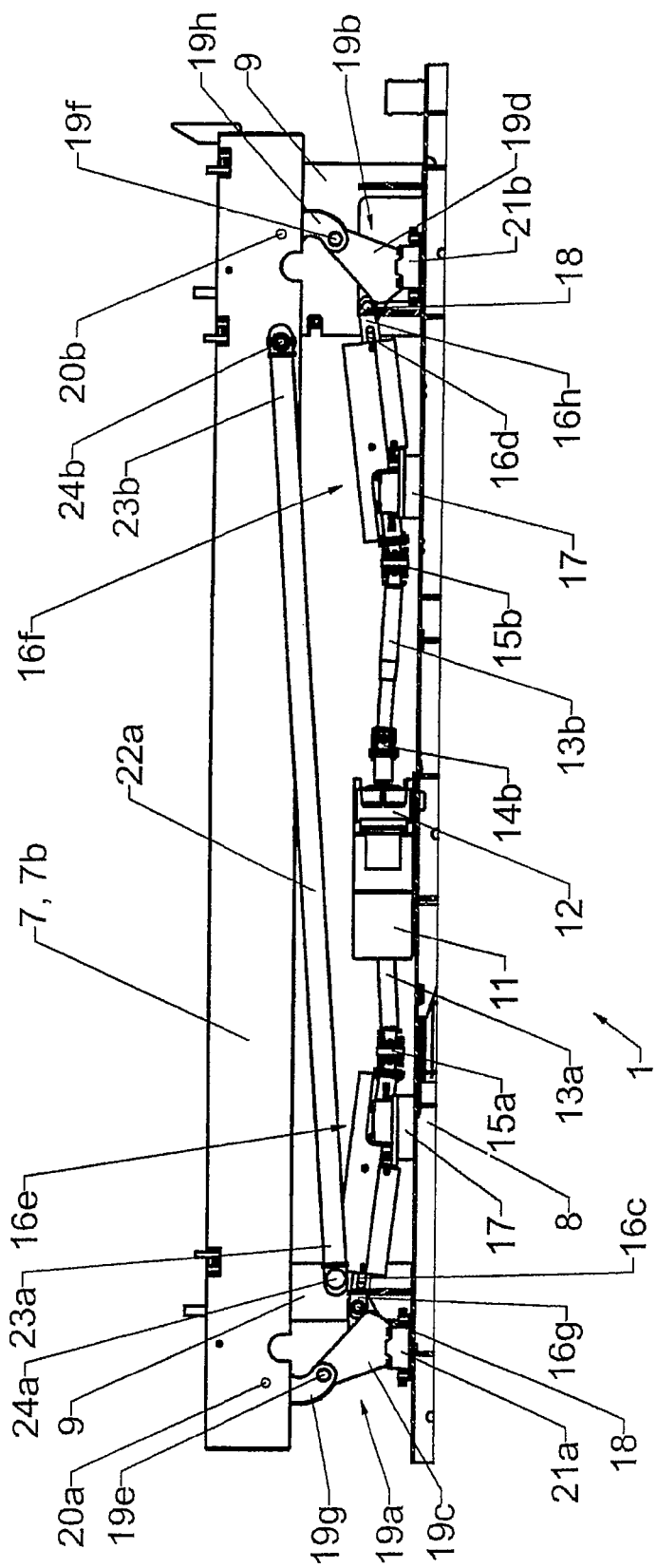
FIG. 6 is a side elevation of a lifting platform in the raised position.

FIG. 5 shows a perspective view of a vehicle 1 in which only a rear part of the first and second lifting platforms 7a, 7b is shown, and also only one part of a lifting drive 10 for the two lifting platforms 7a, 7b. FIG. 6 shows a side view of the raised second lifting platform 7b and the lifting drive 10.

The lifting drive 10 consists essentially of a drive motor 11, which can be electrical or hydraulic, and which has a gearing 12 with transmission and distribution function, and by which a first Cardan joint, or universal joint, 14a, 14b acts on two Cardan shafts, or universal shafts, 13a, 13b. The Cardan shafts 13a, 13b run essentially parallel to the driving direction F of the vehicle 1, which also usually corresponds to the lengthwise direction of the vehicle 1. The end of the Cardan shafts 13a, 13b away from the gearing 12 acts via a second Cardan joint, or universal joint, 15a, 15b, with a double universal joint configuration, on an actuating screw drive 16a, 16b. Each of the actuating screw drives 16a, 16b usually has an actuating screw 16c, 16d, concealed by a cover and mounted in a bearing pedestal 17 articulated to and pivoting on the vehicle frame 8. Mounted on the actuating screw 16c, 16d and likewise concealed by the cover is an adjusting nut 16e, 16f, which is joined to an actuating lever 16g, 16h free of torsion (see FIG. 6). At its end away from the actuating screw drive 16a, 16b, this actuating lever 16g, 16h is articulated by an essentially horizontal axis 18 to a toggle lever 19. For each lifting platform 7a, 7b, there is provided one pair of toggle levers 19a, 19b, of which one front and one rear—looking in the driving direction F—engages with the lifting platform 7a, 7b. The toggle levers 19a, 19b have accordingly a first toggle lever arm 19c, 19d, which is joined to a second toggle lever arm 19g, 19h by a toggle joint 19e, 19f. The actuating lever 16g, 16h is joined to the first lower toggle lever arm 19c, 19d. The end away from the toggle joint 19e, 19f of the second toggle lever arm 19g, 19h is articulated by another horizontal axis 20a, 20b to the lifting platform 7a, 7b. In regard to the toggle levers 19a, 19b, one also notes from FIG. 5 that they have a width around ¾ the width of one of the lifting platforms 7a, 7b. It is provided that the width may be more than 50%, and may be more than 75% of the width of the lifting platform 7a, 7b.

In FIG. 5, as already described, the first lifting platform 7a and also the second lifting platform 7b are each shown in their lowered transport position. Accordingly, the toggle levers 19a, 19b are in their buckled position, in which they have a slight vertical height. Also, in this buckled position, the toggle joints 19e, 19f of the toggle levers 19a, 19b are moved onto each other. Moreover, the end of the first toggle lever arm 19c, 19d away from the toggle joint 19e, 19f is mounted by an essentially horizontal axis 21a, 21b on the vehicle frame 8.

On the other hand, in FIG. 6 the lifting platform 7b is shown in its raised transfer position. Accordingly, the toggle levers 19a, 19b are in their extended position, in which they have a greater vertical height than in the lowered transport position shown in FIG. 5. Furthermore, one sees from FIG. 6 that the second lifting platform 7b shown, precisely like the first lifting platform 7a not shown, is guided in addition by two control rods 22a, 22b relative to the frame 8 of the vehicle 1. The control rods 22a, 22b run essentially with their lengthwise dimension in the driving direction F of the vehicle 1 and are slightly rising in relation to the vehicle frame 8 in the raised transfer position of the lifting platforms 7a, 7b, which is oriented essentially horizontal depending on the parked position of the vehicle, and slightly declining in the direction of the vehicle frame 8 in the transport position of the lifting platforms 7a, 7b. Furthermore, each of the two control arms runs parallel to the lengthwise dimension of the two lifting platforms 7a, 7b and alongside them. Also, they have a slighter length than the lifting platforms 7a, 7b and are arranged alongside them with a slight spacing. A first end 23a of the longitudinal control arms 22a, 22b is articulated by an axis 24a which is essentially horizontal and extending transversely to the driving direction F. The opposite second end 23b of the longitudinal control arms 22a, 22b is articulated to the respective inside of the guide element 9, but underneath the guiding surface 9a of the guide element 9 for the orienting of the container 5, by another axis 24b which is again horizontal and extends basically at right angles to the driving direction F of the vehicle 1. These two longitudinal control arms 22a, 22b have the task of stabilizing the two toggle levers 19a, 19b, to whose respective second toggle lever arm 19g, 19h the respective lifting platform 7a, 7b is fastened, relative to the vehicle frame 8, so that the extending and buckling movement of the toggle levers 19a, 19b is also converted into a raising or lowering movement of the lifting platforms 7a, 7b, and does not lead to a sideways movement of the lifting platforms 7a, 7b. The arrangement of the longitudinal control arms 22a, 22b on the lifting platforms 7a, 7b and the respective guide elements 9 of the vehicle frame 8 is chosen such that the lifting platform 7a, 7b in the lowered position of rest and in the raised transfer position is situated at the same position in terms of its orientation lengthwise and transverse to the vehicle frame 8, looking in the driving direction F of the vehicle 1. Between the transfer position and the resting position, the lifting platform 7a, 7b runs through a slightly curved trajectory, due to the geometry of the toggle levers 19a, 19b and the arrangement of the longitudinal control arms 22a, 22b on the lifting platforms 7a, 7b and the guide elements 9, and does not move exclusively in a linear or vertical manner. The maximum in or opposite the travel direction F of the lifting platforms during the lifting or lowering process varies in the range of a few millimeters, i.e., 2 to 10 mm. The lifting height of the lifting platform 7a, 7b lies roughly in the range of 600 mm. In the transfer position and the resting position, the positions of the lifting platform 7a, 7b coincide, looking in and transversely to the driving direction F of the vehicle 1.

Figure 7:
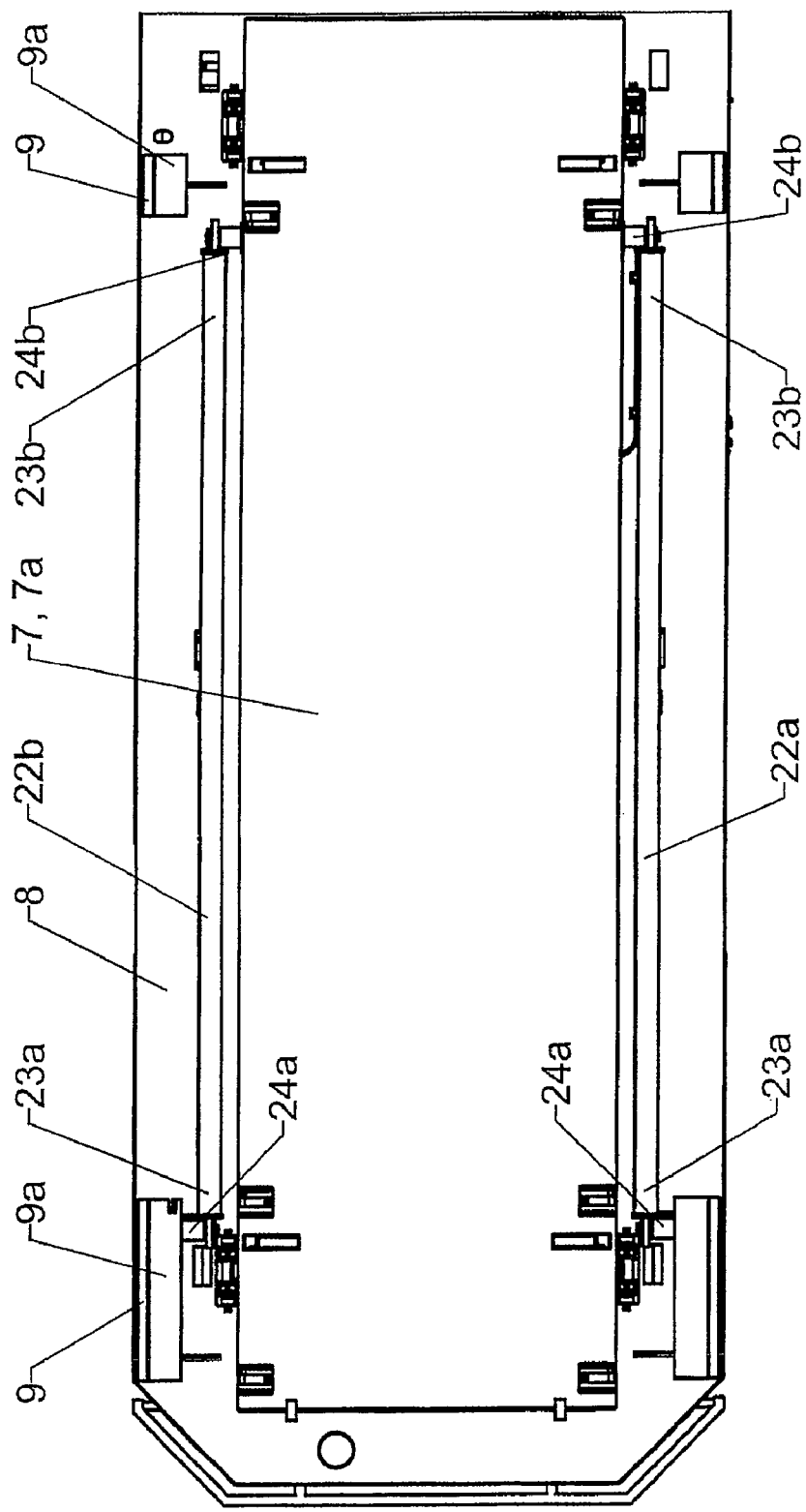
FIG. 7 is a top plan view of a lifting platform of the vehicle shown in FIG. 2.

FIG. 7 shows a top plan view of the second lifting platform 7b per FIG. 6. In particular, it should be noted that the longitudinal control arms 22a, 22b are arranged on the right and left side, looking in the driving direction F of the vehicle 1, next to the lifting platform 7b, and run parallel with the lengthwise axis of the lifting platform 7b and have a spacing from it equal to roughly the width of the longitudinal control arm 22a, 22b. It is also important to mention, for the arrangement of the longitudinal control arms, that the points of articulation of the longitudinal control arms 22a, 22b via the axes 24a, 24b to the lifting platform 7b and the guide element 9 are arranged opposite each other. It is also evident from this view that the guide elements 9 have guide surfaces 9a on their inner side facing each other.

The present invention has been described by means of a floor-bound transportation vehicle for the transport of containers. Basically, it is also possible to transport other heavy loads, such as slabs and coils in foundry, steelmaking and metal rolling operations.

Changes and modifications in the specifically described embodiments can be carried out without departing from the principles of the present invention, which is intended to be limited only by the scope of the appended claims, as interpreted according to the principles of patent law including the doctrine of equivalents.

LIST OF REFERENCE NUMBERS

1 automatically driven vehicle
1a tire
2 transfer station
3 support frame
3a legs
3b support rails
3c end surface
3d support surface
4 floor
5 container
5a corner casting
5b lengthwise side
5c bottom surface
6 entrance channel
7 lifting platform
7a first lifting platform
7b second lifting platform
8 vehicle frame
9 guide element
9a guide surface
10 lifting drive
11 drive motor
12 transmission
13a, 13b Cardan shaft
14a, 14b first Cardan joint
15a, 15b second Cardan joint
16a, 16b actuating screw drive
16c, 16d actuating screw
16e, 16f adjusting nut
16g, 16h actuating lever
17 bearing pedestal
18 axis
19, 19a, 19b toggle lever
19c, 19d first toggle lever arm
19e, 19f toggle joint
19g, 19h second toggle lever arm
20a, 20b upper axis
21a, 21b lower axis
22a, 22b longitudinal control arm
23a first end
23b second end
24a axis
24b axis
a spacing
b width
c width
d spacing
e spacing
F driving direction
f spacing

The invention claimed is:

1. Floor-bound transportation vehicle for the transportation of containers, comprising:
at least one lifting platform arranged on a vehicle frame of the transportation vehicle and at least one lifting drive raising said at least one lifting platform from a lowered transportation position to a raised transfer position and lowering said at least one lifting platform from the transfer position to the transportation position;
at least two toggle levers, each comprising a first toggle lever arm and a second toggle lever arm, which are connected to each other by a toggle joint, wherein said first toggle lever arm is mounted to said vehicle frame via a lower axis of articulation at an end away from said toggle joint and said second toggle arm is mounted to said at least one lifting platform via an upper axis of articulation at an end away from said toggle joint, said at least two toggle levers jointing said at least one lifting platform with said vehicle frame, said toggle levers oriented in the driving direction of the transportation vehicle, wherein said at least one lifting drive acts jointly on the at least two toggle levers for lifting and lowering said at least one lifting platform; and wherein each of said toggle levers extends for more than half the width of the lifting platform as viewed from the driving direction of the transportation vehicle.

2. Transportation vehicle according to claim 1, wherein a first one of said toggle levers is arranged in front of a second one of said toggle levers in the driving direction of the transportation vehicle.

3. Transportation vehicle according to claim 1, wherein said lower axes of articulation, the axes of said toggle joint and said upper axes of articulation run parallel to each other.

4. Transportation vehicle according to claim 3, wherein said at least two toggle levers are arranged between said at least one lifting platform and said vehicle frame so that said toggle joints move onto each other when said at least one lifting platform moves from the transfer position to the transportation position.

5. Transportation vehicle according to claim 4, wherein said at least one lifting platform is guided by at least one longitudinal control arm on said vehicle frame, wherein said at least one longitudinal control arm is articulated to said at least one lifting platform at a first end by a first axis of articulation and it is articulated to the vehicle frame at a second opposite end by a second axis of articulation.

6. Transportation vehicle according to claim 5, wherein said at least one longitudinal control arm and said toggle levers are dimensioned so that said at least one lifting platform in the transportation position coincides with at least one lifting platform in the transfer position as viewed transverse to the driving direction of the vehicle.

7. Transportation vehicle according to claim 6, wherein said first axis of articulation and said second axis of articulation run parallel to each other and parallel to the lower axes of articulation, the axes of the hingelike toggle joints, and the upper axes of articulation.

8. Transportation vehicle according to claim 7, wherein said at least one longitudinal control arm comprises two longitudinal control arms that are arranged at opposite sides of said at least one lifting platform as viewed from the driving direction of the transportation vehicle, and wherein said two longitudinal control arms run parallel to each other.

9. Transportation vehicle according to claim 8, wherein said at least one lifting platform comprises two lifting platforms that are arranged one immediately behind the other in the driving direction of the transportation vehicle.

10. Transportation vehicle according to claim 9, wherein said lifting platforms are of such dimension that a 20-foot container measured in the driving direction of the transportation vehicle can be accommodated by each of said lifting platforms, or said two lifting platforms together can accommodate at least a 40-foot container measured in the driving direction of the transportation vehicle.

11. Transportation vehicle according to claim 10, wherein said lifting drive comprises a drive motor, arranged on said transportation vehicle, which acts on said two toggle levers via a transmission and two actuating screw drives.

12. Transportation vehicle according to claim 1, wherein said at least one lifting platform comprises two lifting platforms that are arranged one immediately behind the other in the driving direction of the transportation vehicle.

13. Transportation vehicle according to claim 12, wherein said lifting platforms are of such dimension that a 20-foot container measured in the driving direction of the transportation vehicle can be accommodated by each of said lifting platforms, or said two lifting platforms together can accommodate at least a 40-foot container measured in the driving direction of the transportation vehicle.

14. Transportation vehicle according to claim 1, wherein said lifting drive comprises a drive motor, arranged on said transportation vehicle, which acts on said two toggle levers via a transmission and two actuating screw drives.

15. Transportation vehicle according to claim 1, wherein said at least two toggle levers are arranged between said at least one lifting platform and said vehicle frame so that said toggle joints move onto each other when said at least one lifting platform moves from the transfer position to the transportation position.

16. Floor-bound transportation vehicle for the transportation of containers, comprising:

at least one lifting platform arranged on a vehicle frame of the transportation vehicle and at least one lifting drive raising said at least one lifting platform from a lowered transportation position to a raised transfer position and lowering said at least one lifting platform from the transfer position to the transportation position;

at least two toggle levers, each comprising a first toggle lever arm and a second toggle lever arm, which are connected to each other by a toggle joint, wherein said first toggle lever arm is mounted to said vehicle frame via a lower axis of articulation at an end away from said toggle joint and said second toggle arm is mounted to said at least one lifting platform via an upper axis of articulation at an end away from said toggle joint, said at least two toggle levers jointing said at least one lifting platform with said vehicle frame, said toggle levers oriented with a first one of said toggle levers arranged in front of a second one of said toggle levers in the driving direction of the transportation vehicle, wherein said at least one lifting drive acts jointly on the at least two toggle levers for lifting and lowering said at least one lifting platform;

wherein each of said toggle levers extends for more than 75 percent of the width of the lifting platform as viewed from the driving direction of the transportation vehicle.

17. Transportation vehicle according to claim 16, wherein said lower axes of articulation, the axes of said toggle joint and said upper axes of articulation run parallel to each other.

18. Transportation vehicle according to claim 17, wherein said at least two toggle levers are arranged between said at least one lifting platform and said vehicle frame so that said toggle joints move onto each other when said at least one lifting platform moves from the transfer position to the transportation position.

19. Transportation vehicle according to claim 16, wherein said at least one lifting platform is guided by at least one longitudinal control arm on said vehicle frame, wherein said at least one longitudinal control arm is articulated to said at least one lifting platform at a first end by a first axis of articulation and it is articulated to the vehicle frame at a second opposite end by a second axis of articulation.

20. Transportation vehicle according to claim 19, wherein said at least one longitudinal control arm and said toggle levers are dimensioned so that said at least one lifting platform in the transportation position coincides with at least one lifting platform in the transfer position as viewed transverse to the driving direction of the vehicle.

21. Transportation vehicle according to claim 20, wherein said first axis of articulation and said second axis of articulation run parallel to each other and parallel to the lower axes of articulation, the axes of the hingelike toggle joints, and the upper axes of articulation.

22. Transportation vehicle according to claim 19, wherein said at least one longitudinal control arm comprises two longitudinal control arms that are arranged at opposite sides of said at least one lifting platform as viewed from the driving direction of the transportation vehicle, and wherein said two longitudinal control arms run parallel to each other.

23. Floor-bound transportation vehicle for the transportation of containers, comprising:
   at least one lifting platform arranged on a vehicle frame of the transportation vehicle and at least one lifting drive raising said at least one lifting platform from a lowered transportation position to a raised transfer position and lowering said at least one lifting platform from the transfer position to the transportation position;
   at least two toggle levers jointing said at least one lifting platform with said vehicle frame, said toggle levers oriented in the driving direction of the transportation vehicle, wherein said at least one lifting drive acts jointly on the at least two toggle levers for lifting and lowering said at least one lifting platform;
   wherein each of said toggle levers extends for more than half the width of the lifting platform as viewed from the driving direction of the transportation vehicle;
   wherein said at least one lifting platform is guided by at least one longitudinal control arm on said vehicle frame, wherein said at least one longitudinal control arm is articulated to said at least one lifting platform at a first end by a first axis of articulation and it is articulated to the vehicle frame at a second opposite end by a second axis of articulation.

24. Transportation vehicle according to claim 23, wherein said at least one longitudinal control arm and said toggle levers are dimensioned so that said at least one lifting platform in the transportation position coincides with at least one lifting platform in the transfer position as viewed transverse to the driving direction of the vehicle.

25. Transportation vehicle according to claim 23, wherein said first axis of articulation and said second axis of articulation run parallel to each other and parallel to the lower axes of articulation, the axes of the hingelike toggle joints, and the upper axes of articulation.

26. Transportation vehicle according to claim 23, wherein said at least one longitudinal control arm comprises two longitudinal control arms that are arranged at opposite sides of said at least one lifting platform as viewed from the driving direction of the transportation vehicle, and wherein said two longitudinal control arms run parallel to each other.

* * * * *